US006275639B1

(12) United States Patent
Bolt et al.

(10) Patent No.: US 6,275,639 B1
(45) Date of Patent: Aug. 14, 2001

(54) OPTICAL FIBER SPLICE CLOSURE

(76) Inventors: Sidney Joseph Bolt, Pierrot, Bottom Lane, Ogbourne St George, Wiltshire (GB), SN8 1SL; Ian Ferris, 4 Kelsey Avenue, Finchampstend, Berkshire (GB), RG1 4TZ; Jean-Marie Etienne Nolf, 89 Bierbeekstraat, B-3360 Korbeek-Lo (BE); Luk Macken, Kortrijksestraat 20, B-3010 Kessel-Lo (BE); Valere Buekers, Oude Schansstraat 26, B-3545 Zelem-Halen (BE); Daniel Daems, De Dreef van Zonnebos 10, 2970 s'Gravenwezel (BE)

( * ) Notice: Subject to any disclaimer, the term of this patent is extended or adjusted under 35 U.S.C. 154(b) by 0 days.

(21) Appl. No.: 09/242,660
(22) PCT Filed: Aug. 21, 1997
(86) PCT No.: PCT/GB97/02250
§ 371 Date: Feb. 19, 1999
§ 102(e) Date: Feb. 19, 1999
(87) PCT Pub. No.: WO98/08125
PCT Pub. Date: Feb. 26, 1998

(30) Foreign Application Priority Data

Aug. 22, 1996 (GB) .................................................. 9617591

(51) Int. Cl.⁷ ................................................... G02B 6/00
(52) U.S. Cl. ........................................... 385/135; 385/134
(58) Field of Search ................................................ 385/135

(56) References Cited

U.S. PATENT DOCUMENTS

| | | | |
|---|---|---|---|
| 4,428,645 | 1/1984 | Korbelak et al. | 350/96.2 |
| 4,687,289 | 8/1987 | DeSanti | 350/96.2 |
| 4,753,499 | 6/1988 | Malkani et al. | 350/96.2 |
| 4,805,979 | * 2/1989 | Bossard et al. | 385/135 |

FOREIGN PATENT DOCUMENTS 0 108 518    10/1983    (EP) ................................. H01R/4/70

OTHER PUBLICATIONS

Patent Abstracts of Japan; Furukawa Electric Co Ltd: The; Feb. 21, 1986 publication No. 61036704; Int. Cl. G02B 6/00; Inventor: Tategami Shigeru; Title: Optical Cable Connection Box.

* cited by examiner

Primary Examiner—Cassandra Spyrou
Assistant Examiner—Craig Curtis
(74) Attorney, Agent, or Firm—Allen Dyer, Doppelt, Milbrath & Gilchrist, P.A.

(57) ABSTRACT

An optical fiber splice closure includes a casing for containing a plurality of optical fiber splices, and a support which is contained within the casing. The support carries a plurality of optical fiber splices. Sealant is contained within the casing and encapsulates at least part of the support.

23 Claims, 12 Drawing Sheets

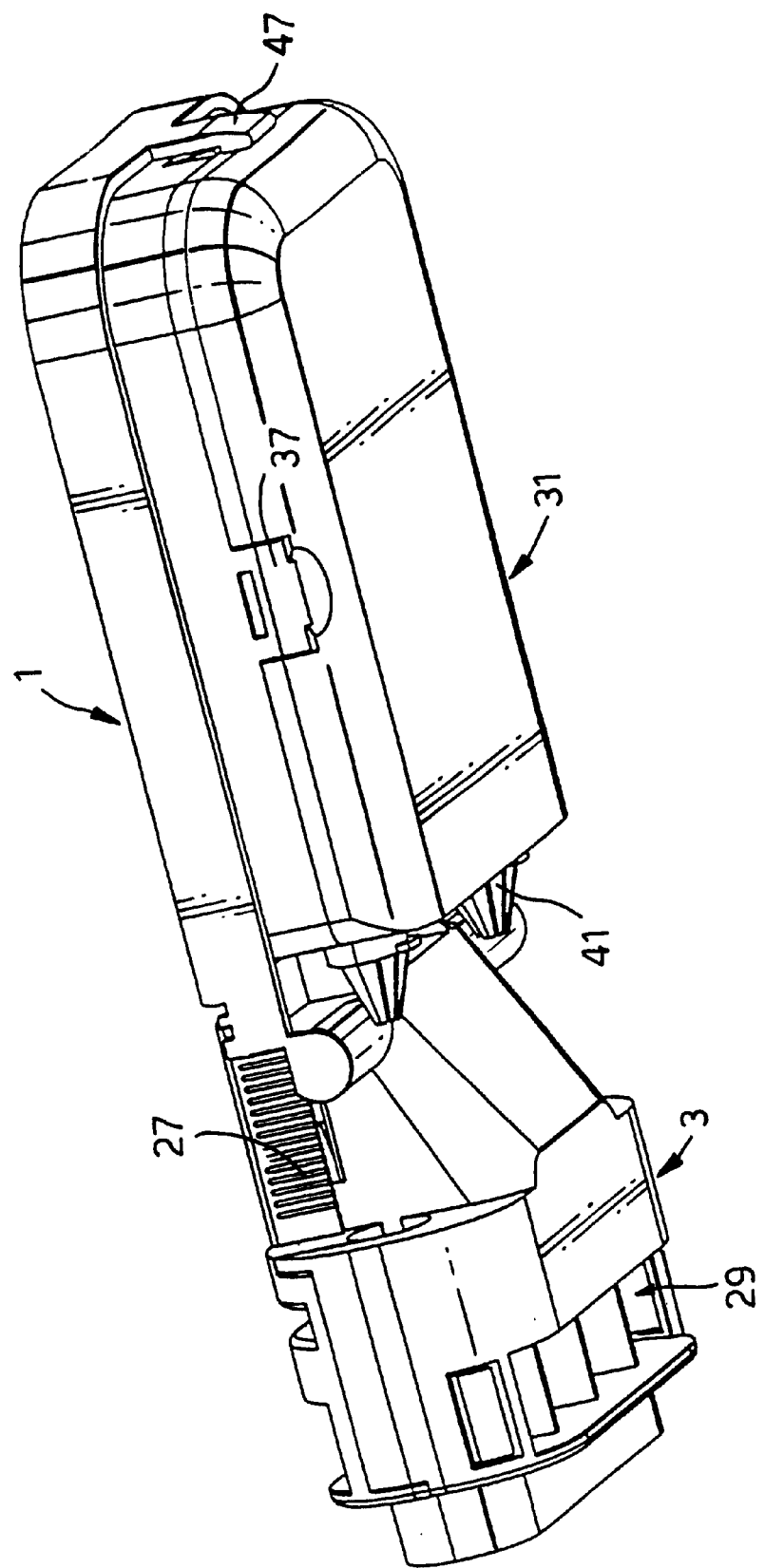

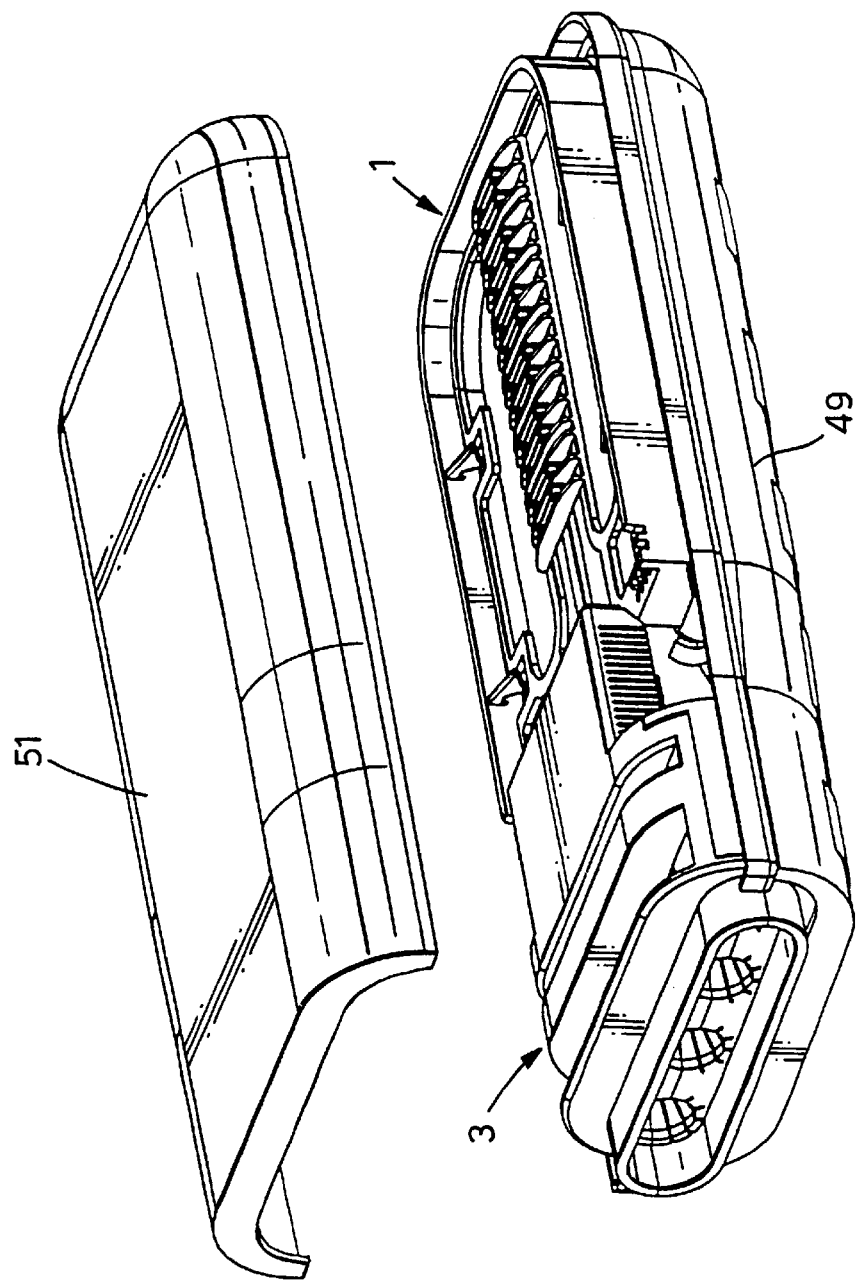

OPTICAL FIBER SPLICE CLOSURE

FIELD OF THE INVENTION

This invention relates to an optical fiber closure.

BACKROUND OF THE INVENTION

Optical fiber splice closures (which are sometimes called splice cases or enclosures) generally comprise a casing which provides a closed space for containing splices between optical fibers. Such closures normally must also contain significant lengths of the spliced optical fibers. These lengths of optical fibers (which may be called "excess fiber" ) are normally required in order to be able to carry out the fiber splicing operation, which is generally performed using splicing equipment next to the closure. Excess fiber may also be required in order to organize the fiber splices in the closure. Optical fiber splice closures normally include some means of storing the splices in an organized manner. The excess optical fiber associated with the organized splices needs to be stored in the closure in such a way that its bend radius does not fall below the critical bend radius of the fiber (which is typically about 30 nm). The critical bend radius of an optical fiber is the minimum safe radius at which the fiber may be bent without causing damage to the fiber or causing signal loss in the fiber.

International patent application WO 95/07480 (Raychem) discloses an extremely effective optical fiber splice closure. The closure comprises a casing consisting of a generally circular base and a dome-shaped cover which may be attached and sealed to the base to close the casing. In use, the optical fiber cables enter the casing through a plurality of cable ports in the base. The cable ports of a closure of this type are commonly sealed around the cables by means of heat-shrinkable sleeves which are heated by a gas torch to cause them to shrink and seal around the cables. The closure of WO 95/07480 includes a highly sophisticated optical fiber organizer which provides the highest degree of fiber and splice organization, by means of a series of trays which are hinged to a large base plate which itself guides the optical fibers to and from the trays in a highly organized manner.

International patent application WO 89/10648 (Raychem) discloses a much simpler splice closure which may be used for electrical conductors (e.g. wires) or optical fibers. The closure comprises two casing parts and a sealing material contained in the casing parts. The two casing parts are held and forced together by means of springs positioned around them. One or both casing parts has/have a deformable surface, and the springs are so shaped as to cause the deformable surface(s) to be deformed towards the sealing material, thereby putting the sealing material under compression. Optical fibers containing splices may be placed between two portions of the sealing material. The splices are simply arranged in a row in one of the casing parts directly on one of the portions of sealing material, and the optical fibers leading to the splices are separated in a comb-like article which is referred to as a conductor organizer. The other casing part, containing another portion of sealing material is then placed on top of the first casing part, sandwiching the optical fibers and splices between the two portions of sealing material.

SUMMARY OF THE INVENTION

According to a first aspect, the present invention provides an optical fiber splice closure, comprising:
(a) a casing for containing a plurality of optical fiber splices;
(b) a support which, at least in use, is contained in the casing and on which, in use, a plurality of optical fiber splices are located; and
(c) sealant which, at least in use, is contained in the casing and encapsulates at least part of the support.

The invention has the advantage that it provides a simple yet effective splice closure which provides firm location, and hence the possibility of effective and reliable organization, of optical fiber splices. This firm location of the optical fiber splices is provided by the support on which the splices may be located. Because the support is encapsulated in the sealant, the supported optical fiber splices are placed in a sealed and protective environment which is provided in a simple yet effective manner. The sealant preferably encapsulates substantially the entire support.

The support preferably includes a plurality of splice holders for holding the optical fiber splices. The splice holders may, for example, be arranged in at least one series along at least part of the support. The splice holders are preferably arranged such that splices held in them in use are substantially mutually parallel. The orientation of the splice holders is preferably such that splices held in them are substantially perpendicular to the direction in which the optical fiber cable(s) and/or optical fibers extend into the closure.

The term "optical fiber splices" as used in this specification includes optical fiber connectors, optical fiber splitters or couplers, or the like, in addition to optical fiber splices (e.g. fusion splices) as such.

The support preferably includes guide means for guiding optical fibers to and from the splices. The guide means preferably comprise one or more projections which project from one or more surfaces of the support. The projections may, for example be generally hook-like, and may be flexible in order to facilitate the location of one or more optical fibers in place. Other types of guide means which may additionally or alternatively be used include channels, grooves or other apertures, and tie wraps or other securement devices.

Advantageously, the support may be in the form of at least one tray. By a "tray" is meant a generally flat structure which may, for example, be generally plate-like or frame-like. There may be one or more walls or other projections extending above a major surface of the tray, for example one or more peripheral walls.

In some preferred embodiments, the support has a plurality of holes extending through it. More preferably, the support comprises at least one mesh or the like (which may, for example, be formed from a woven or non-woven fabric, or may be formed from a plastics material or a metal). The sealant can preferably extend through the holes in the support during use. This has the advantage that the sealant preferably can substantially completely encapsulate each optical fiber on the support. In a preferred arrangement, the support comprises at least two meshes between which the spliced optical fibers are located in use.

It has been found that when optical fibers contact each other, for example if they cross-over each other, the optical signals carried by the fibers may become attenuated. This is believed to be due, at least in part, to localized pressure on the fibers at their point of contact, which can result in localized bending and/or compression of the fibers. This belief is supported by the finding that if two fibers are pressed together at their point of contact the signal attenuation generally becomes more severe. Such pressing together of crossing (or otherwise contacting) optical fibers may arise in some conventional optical fiber organizers.

The inventors of the present invention have discovered that if two mutually contacting optical fibers are encapsulated in sealant and the sealant is subjected to a compressive force, signal attenuation in the optical fibers due to the mutual contact between them either does not occur at all, or occurs to a significantly lesser extent than would be the case if the two optical fibers were directly subjected to the same compressive force in the absence of the sealant. This phenomenon is believed to be due to the sealant distributing the compressive force substantially evenly around the periphery of each of the fibers. The phenomenon is most readily apparent in sealants which behave hydrostatically or pseudo-hydrostatically, such as gel sealants (which are described in more detail below), i.e. in sealants which distribute pressure similarly to liquids.

Embodiments of the invention in which the support is perforated (e.g. in the form of a mesh) exploit this phenomenon to prevent or reduce signal attenuation in optical fibers on the support which contact each other. Because the sealant can extend through holes in the support (at least if and when the sealant is put under compression) it can normally completely surround the optical fibers. Thus any compressive force applied to the sealant may be distributed substantially evenly around each optical fiber, thereby substantially avoiding signal attenuation at the fiber cross-over points. (Applying a compressive force to certain sealants, e.g. gel sealants, is advantageous because it enhances their sealing properties.) Further advantages of a perforated support are described below in relation to FIG. 12.

The closure of the invention preferably includes securement means attached, at least in use, to the support, for securing one or more optical fiber cables and/or optical fibers extending into the casing, with respect to the support. The securement means preferably secure(s) one or more such cables and/or fibers at or near their point of entry into the casing. A preferred securement means comprises a hollow, e.g. generally U-shaped, member which slots into a cable-entry part of the closure (which cable-entry part is preferably attached or attachable, directly or indirectly, to the support). One or more tie-wraps or other tightenting means preferably secure a cable or optical fiber extending through the hollow member, to the hollow member.

There is preferably at least one optical fiber routing means situated between the securement means and the support. The or each routing means may, for example, comprise one or more projections, channels, grooves, apertures, tie-wraps etc.

The cable-entry part of the closure preferably comprises one or more cable-entry apertures and one or more securement means (as mentioned above). Advantageously, the cable-entry part may comprise a housing which, in use, is contained at least partially within the casing and which encloses the securement means. The housing, at least in use, preferably contains sealant for sealing around one or more optical fiber cables extending into the casing and secured by the securement means. The or each routing means is preferably also contained in the housing.

In particularly preferred embodiments of the invention, the closure firther comprises storage means for storing one or more optical fibers which are not spliced in the closure, which storage means, at least in use, is enclosed in the casing and is at least partially encapsulated by the sealant. The storage means preferably comprises a container which, in use, contains the optical fiber(s) which it stores, and substantially excludes the sealant from its interior.

Accordingly, a second aspect of the invention provides an optical fiber splice closure, comprising:

(a) a casing for containing a plurality of optical fiber splices;
(b) a storage means comprising a container which, at least in use, is contained in the casing and in which, in use, are stored one or more optical fiber(s); and
(c) sealant which, at least in use, is contained in the casing and encapsulates at least part of the storage means;
the storage means substantially excluding the sealant from its interior.

The sealant preferably encapsulates substantially the entire storage means.

The storage means may be a substantially rigid container, e.g. a box or the like. The container preferably comprises a base and a lid. It preferably has at least one aperture through which, in use, the stored optical fiber(s) extend(s) into its interior. Advantageously, there may be a plurality of flexible tines situated around the exterior of the or each aperture such that they form a generally conical or frusto-conical barrier around the optical fiber(s) which substantially prevents ingress of the sealant into the interior of the storage means. One or more tie-wraps and/or tapes or the like may be used to tighten the tines around the optical fiber(s).

Additionally or alternatively, the storage means may comprise a flexible bag. The bag is preferably formed from metal (e.g. aluminium) foil and/or polymer (e.g. polyester). A particularly preferred construction for the wall(s) of the bag comprises metallized polymer (e.g. aluminium coated polyester). Such a construction is generally strong, tear-resistant and highly impervious. In some embodiments, the bag may be supplied as an open sheet or the like which may be wrapped and closed around the stored optical fibers.

A storage means in the form of a bag preferably has at least one aperture through which the stored optical fiber(s) may extend into its interior. The or each aperture is preferably sealed, in use, by means of sealant (e.g. the same sealant or the same type of sealant which encapsulates the bag). The or each aperture may advantageously by tightened and/or divided into a plurality of apertures by means of one or more cords, ties, draw-strings, clips or the like.

The storage means (whether or not in the form of a container) preferably includes at least one substantially rigid member around which the stored optical fiber(s) may be wound. The or each substantially rigid member may be a bobbin or the like.

The storage means is preferably attachable to the support. Such attachment, in use, preferably permits some relative movement between the storage means and the support. The attachment may be by means of one or more interlocking parts of the storage means and the support.

As mentioned above, the sealant preferably comprises gel sealant. The gel may, for example, comprise silicone gel, urea gel, urethane gel, thermoplastic gel, or any suitable gel or gelloid sealing material. Gels are normally substantially incompressible; when placed under a compressive force they normally flow and conform to their surroundings, and form a sealed contact with other surfaces. Preferred gels comprise oil-extended polymers. The polymer may, for example, comprise an elastomer, or a block copolymer having relatively hard blocks and relatively elastomeric blocks. Examples of such copolymers include styrene-butadiene or styrene-isoprene diblock or triblock copolymers, e.g. as disclosed in International Patent Application WO88/00603 (the entire disclosure of which is incorporated herein by reference). More preferably, however, the polymer of the gel may comprise one or more styrene-ethylene-propylene-styrene block copolymers. The extender oils used in preferred gels may, for example, be hydrocarbon oils, e.g.

paraffinic or naphthenic oils or polypropene oils, or mixtures thereof. The gel may also contain additives, e.g. moisture scavengers (such as Benzoyl Chloride), antioxidants, pigments and/or fungicides.

The sealant preferably has a cone penetration value of from 100 to 350 ($10^{-1}$mm), more preferably 200 to 260 ($10^{-1}$ mm), especially 230 to 250 ($10^{-1}$ mm), measured according to ASTM D217-68 at 21° C. using a standard 1:1 scale cone (cone weight 102.5 g, shaft weight 47.5 g). Additionally or alternatively, the sealant preferably has an ultimate elongation of at least 200%, measured according to ASTM D638-80 at 21° C. using a Type 4 die to cut the sample, and at a speed of 50 cm/minute.

The casing preferably comprises at least two parts which may be brought together to contain the support and the sealant. More preferably, the casing comprises two half-shells.

As mentioned above, the sealant is preferably put under compression in use. The closure therefore preferably includes at least one resilient member which maintains the sealant under compression. The or each resilient member preferably urges the casing parts (e.g. half shells) together, thereby putting and/or maintaining the sealant under compression. At least one of the casing parts, preferably each casing part, may have a deformable surface, and the or each resilient member is preferably so shaped as to cause the deformable surface to be deformed towards the sealant in use, thereby putting and/or maintaining the sealant under compression. The or each resilient member is preferably placed around the outside of the casing parts (e.g. both half shells) in use. The or each resilient member preferably comprises a spring or the like.

BRIEF DESCRIPTION OF THE DRAWINGS

The invention will now be described, by way of example, with reference to the accompanying drawings, of which:

FIG. 7 is another view of the assembled support, cable-entry part and storage means of FIGS. 5 and 6;

FIG. 8 shows an optical fiber splice closure according to the invention;

DETAILED DESCRIPTION OF THE PREFERRED EMBODIMENTS

Figure 1:
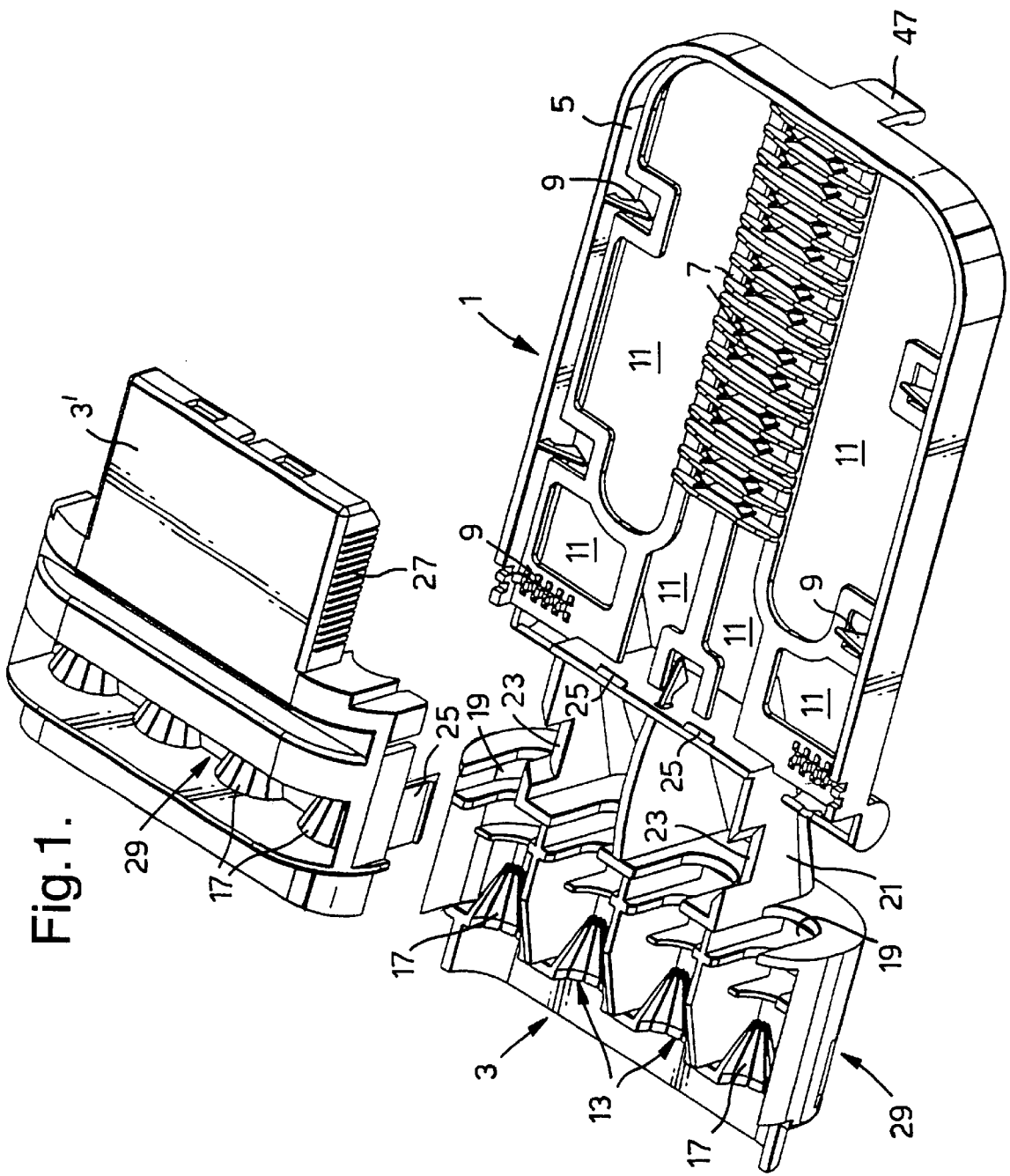
FIG. 1 shows a support and a cable-entry part of an optical fiber closure according to the invention.

FIG. 1 shows a support 1 and a cable-entry part 3 of an optical fiber closure according to the invention. The support 1 comprises a generally rectangular tray which has a peripheral wall 5. The tray includes a series of optical fiber splice holders 7, and a plurality of guide means 9 for guiding optical fibers to and from their splices. The gaps 11 in the tray preferably contain a mesh (not shown).

The cable-entry part 3 comprises a housing which has a detachable part 3'. The housing contains four cable-entry apertures 13. Each cable-entry aperture 13 (which is split between the two parts of the housing 3) has a plurality of flexible tines 17 situated around it and extending towards the interior of the closure such that they form (when the two housing parts are connected together) a generally conical or frusto-conical barrier around the optical fibers or optical fiber cables which extend through the aperture 13 in use. These flexible tines 17 are intended to prevent sealant (not shown) from escaping out of the closure through the apertures 13 while accommodating any of a range of sizes of optical fiber cable or any of a range of numbers of optical fiber. Preferably, in use, two of the apertures 13 contain optical fiber cables (or a single looped cable) extending into the closure, and the other two apertures 13 contain optical fibers extending out of the closure. The optical fibers extending out of the closure are preferably contained in protective tubes or jackets. The cable-entry housing 3 also contains slots 19, into which, in use, are received securement means (not shown) for securing the optical fibers with respect to the support. The securement means preferably comprise gripping members which can be tightened around the cables or fibers.

Between the slots 19 and the support 1 is an interconnecting part 21 which interconnects the main part of the cable-entry part 3 with the support 1. This interconnecting part 21 also forms part of the enclosed housing. It includes optical fiber routing means in the form of openings 23 in two of its walls. When the top part 3' of the housing is connected (by means of resilient catches 25) to the bottom part of the housing, flexible fingers 27 in the top part 3' allow the optical fibers to extend out of the housing and onto the support.

In use, the housing 3, including the hollow interconnecting part 21, is completely filled with sealant (not shown). Also, cavities 29 in the exterior of the housing 3 are filled with sealant.

Figure 2:
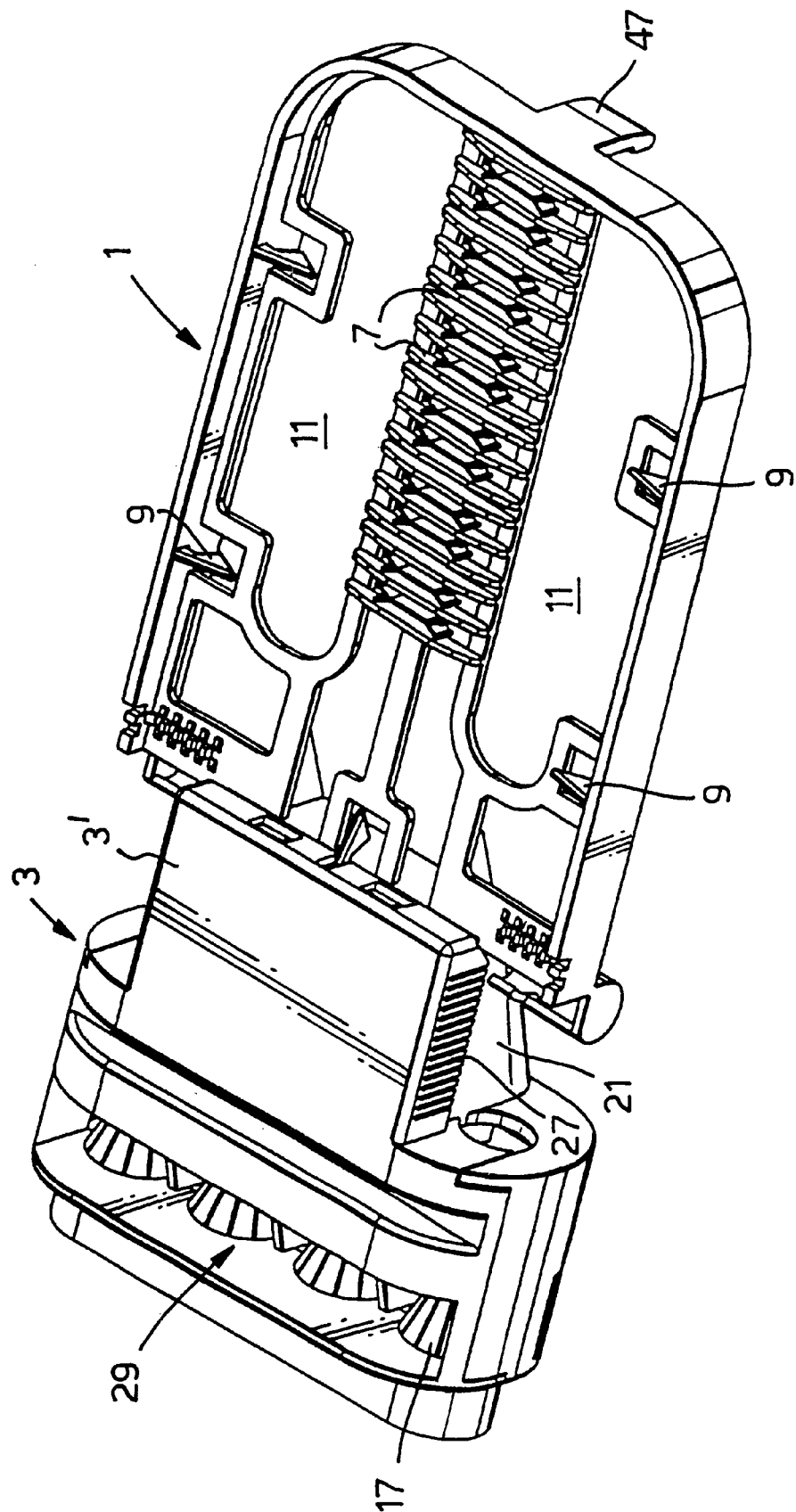
FIG. 2 shows the same support and cable-entry part as that shown in FIG. 1, with a housing cover of the cable-entry part attached.

FIG. 2 shows the support and cable entry part shown in FIG. 1, with the top part or cover 3' of the housing 3 attached, by means of resilient catches 25, to the bottom part of the housing 3.

Figure 3:
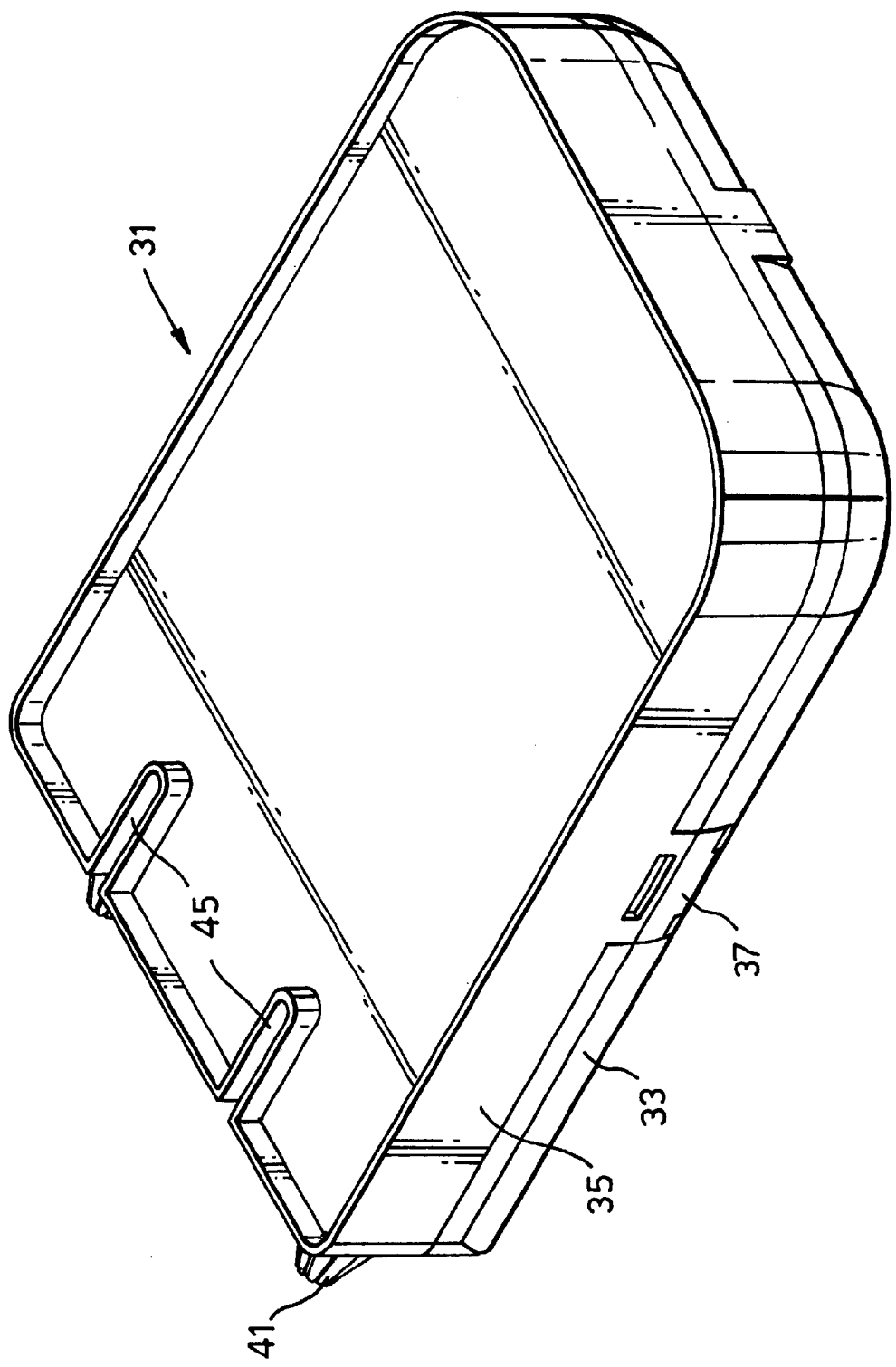
FIG. 3 shows a storage means according to the invention.
Figure 4:
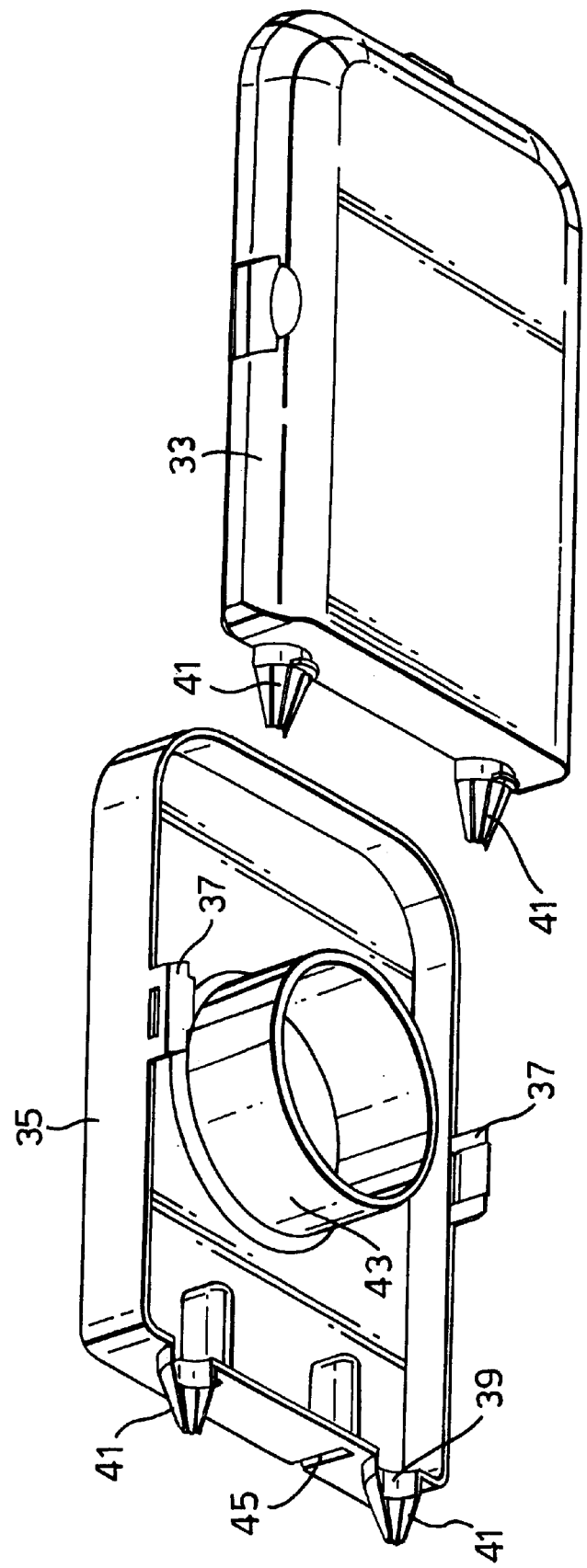
FIG. 4 shows the storage means of FIG. 3, with its base and lid disconnected.

FIGS. 3 and 4 show a storage means 31 of an optical fiber splice closure according to the invention. The storage means 31 is in the form of a box-like container having a base 33 and a lid 35. In FIG. 3 the base 33 and lid 35 are attached to each other by means of resilient catches 37, and in FIG. 4 the base and lid are separated.

The storage means 31 has two apertures 39, which are each split between the base 33 and the lid 35, through which, in use, optical fibers extend into the interior of the container to be stored. Each aperture 39 has a plurality of flexible tines 41 (similar to the tines 17 of the cable-entry apertures 13 of the cable-entry part 3 shown in FIGS. 1 and 2) situated around its exterior. The tines 41 extend away from the storage means 31 such that they form a generally conical or frusto-conical barrier around the optical fiber(s) extending in use, through the apertures 39, to prevent ingress of sealant into the interior of the storage means. The tines 41 may be retained tightly around the optical fibers by means of tie-wraps and/or tape, or the like. (This is also true of the tines 17 of the cable-entry part 3.)

The storage means 31 includes a substantially rigid member 43 in its interior (shown extending from the lid 35 in FIG. 4). The substantially rigid member 43 comprises a bobbin or the like around which the stored optical fiber(s) may be wound. The substantially rigid member 43 also has an added use of providing rigidity to the storage means 31 so that it does not collapse under the pressure which may be applied to the surrounding sealant in use. The optical fiber(s) which is/are stored in the storage means in use is/are preferably contained in protective tubes or jackets.

Figure 5:
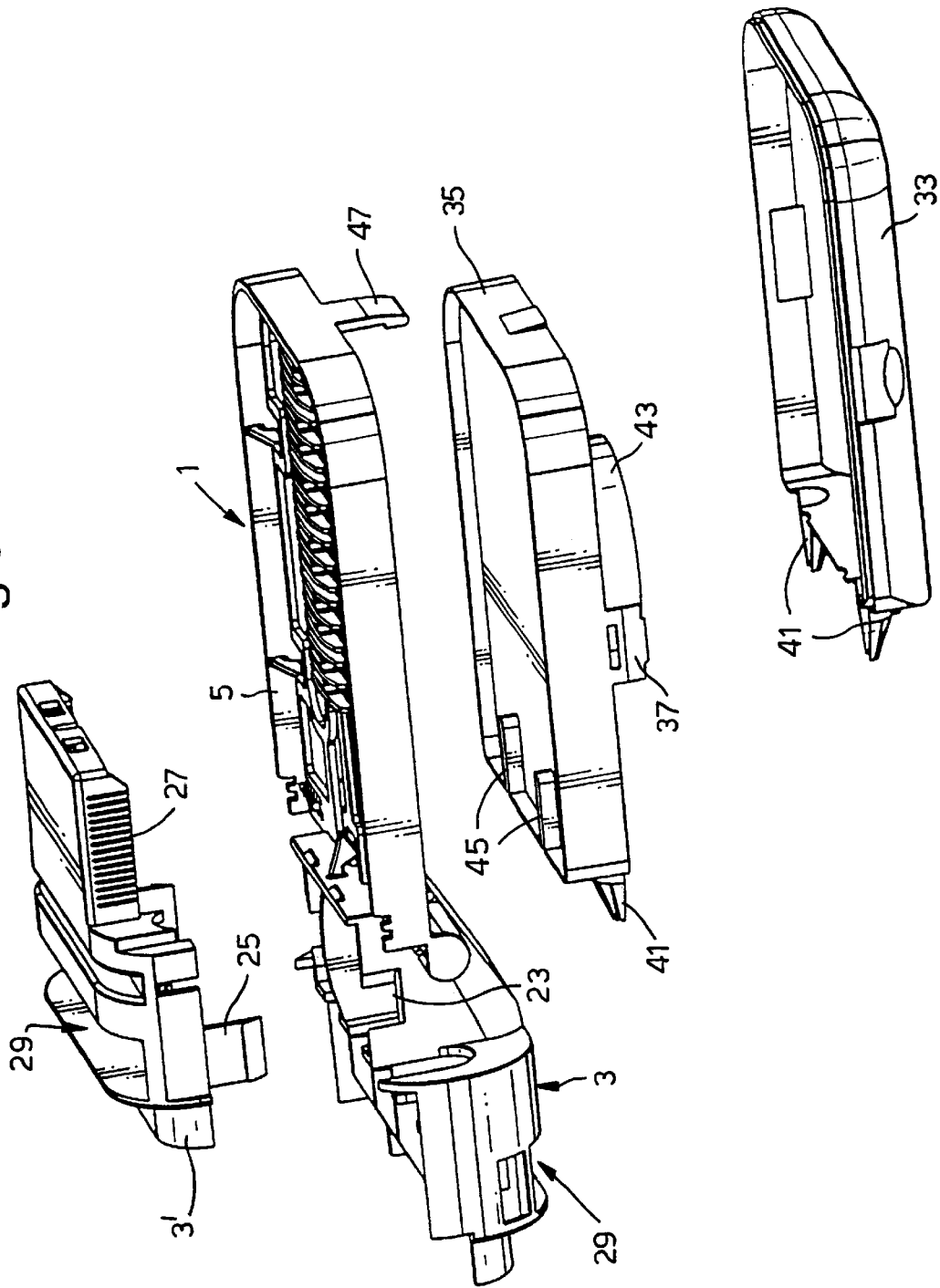
FIG. 5 is an exploded view of the support, cable-entry part and storage means of FIGS. 1 to 4.
Figure 6:
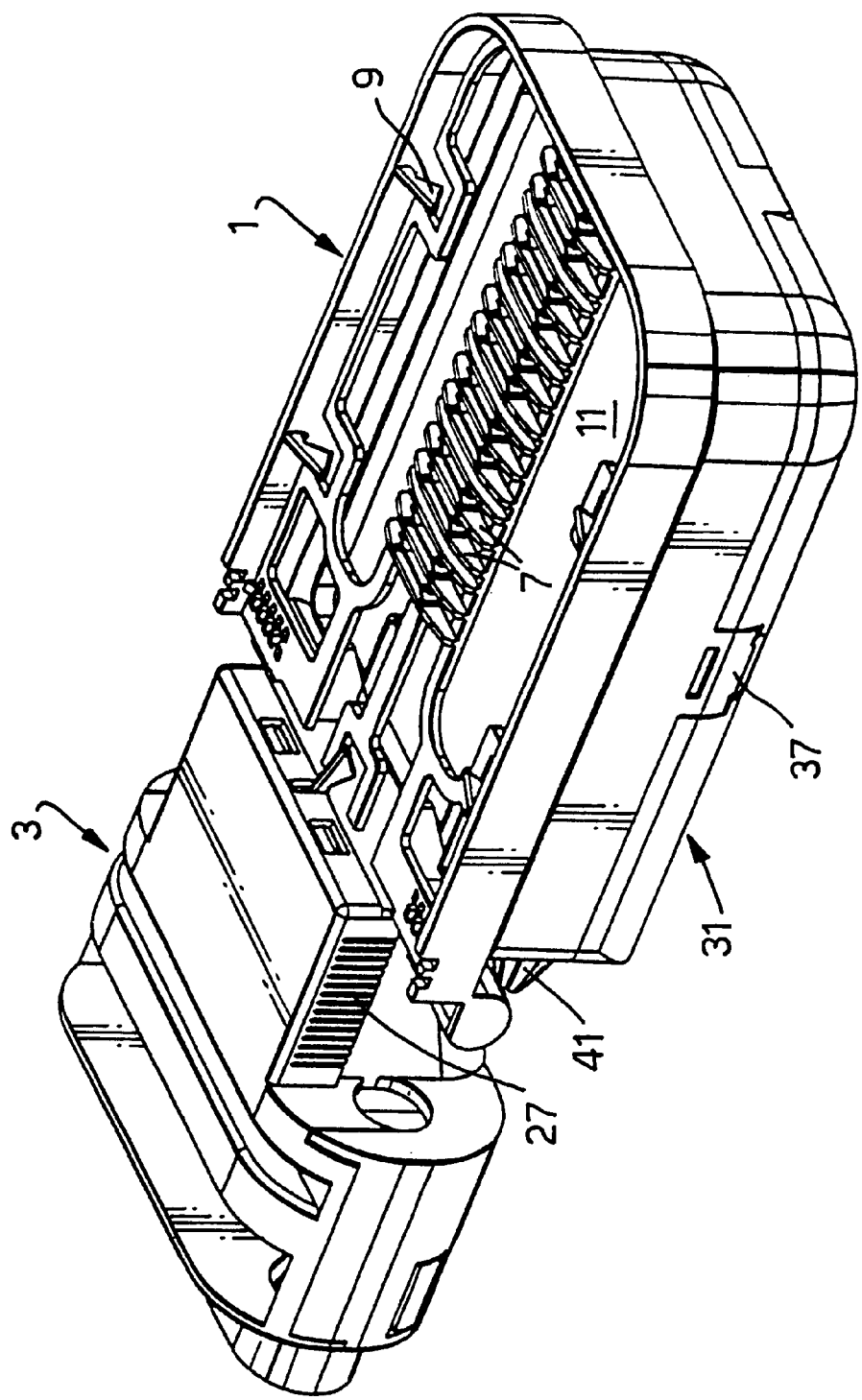
FIG. 6 shows the support, cable-entry part and storage means of FIG. 5 assembled together.

The lid 35 of the storage means 31 contains two channels 45 to enable it to fit snugly against the underside of the support 1 and part of the cable-entry part 3 illustrated in FIGS. 1 and 2. FIG. 5 is an exploded view of the support 1, cable-entry part 3, and storage means 31. FIGS. 6 and 7 show the storage means 31 attached to the underside of the support 1. The storage means 31 is preferably attached to the support 1 by means of at least one resilient catch 47 on the support, as shown in FIG. 7 (in FIG. 6 the catch 47 is omitted). In use, there is preferably sealant between the support 1 and the storage means 31. The sealant between these two components may advantageously be provided as a layer, e.g. a pad, located on top of the lid 35 of the storage means 31. During use, some relative movement between the support 1 and the storage means 31 is preferably possible. This, for example, may allow some of the sealant between the storage means 31 and the support 1 to extend through holes (e.g. holes of a mesh) in the support 1 without leaving a void between the storage means and the support.

FIG. 8 shows the assembled support 1, cable-entry part 3, storage means 31 (which is hidden from view) of the previous figures inserted into a half-shell 49 of a casing. The other half-shell 51 of the casing is shown above the other components of the closure. The two half-shells 49, 51 of the casing when brought together provide a casing which has an open end which locates around the cable-entry part 3, and an opposite closed end around the end of the support 1 which is furthest from the cable-entry part 3. In use, the two casing half-shells 49, 51 are held together by means of one or more resilient members placed around them (not shown in FIG. 8). Each half-shell 49, 51 contains sealant (also not shown in FIG. 8) which, when the half-shells are brought together encapsulates at least the support 1.

Figure 9A:
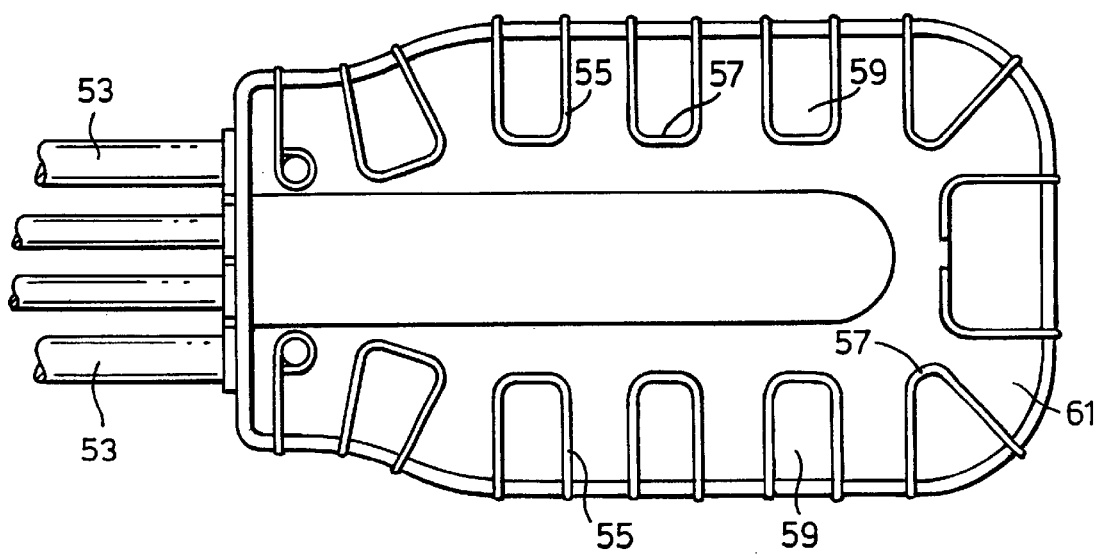
FIGS. 9A and 9B shows two views of the exterior of another optical fiber splice closure according to the invention.
Figure 9B:
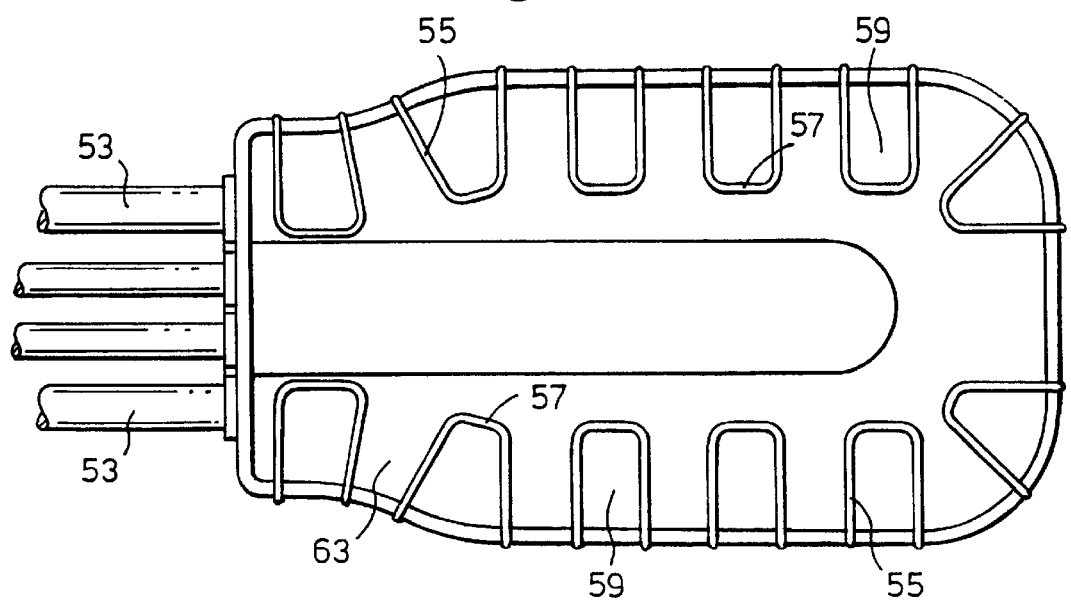

FIGS. 9A and 9B show, respectively, views of the bottom and top of another optical fiber splice closure according to the invention. In this case the closure is fully assembled and closed around stored optical fibers and splices between the fibers. Optical fiber cables 53 are shown extending into the closure. Also shown are two resilient members 55 which are each located around the exterior of both casing half-shells, to hold the half-shells together. Each resilient member 55 is formed from a single piece of metal wire that has two series of generally U-shaped regions 57 which individually locate around discrete raised portions 59 on the major exterior surfaces 61, 63 of the half-shells in a manner similar to that disclosed in international patent application WO89/10648 (mentioned above), the entire disclosure of which is incorporated herein by reference. The major surface 61, 63 of each half-shell is deformable such that when the resilient members 55 are located around the half-shells they deform the half-shells inwardly, thereby putting, and maintaining, the sealant which is contained in the half-shells under compression.

Figure 10:
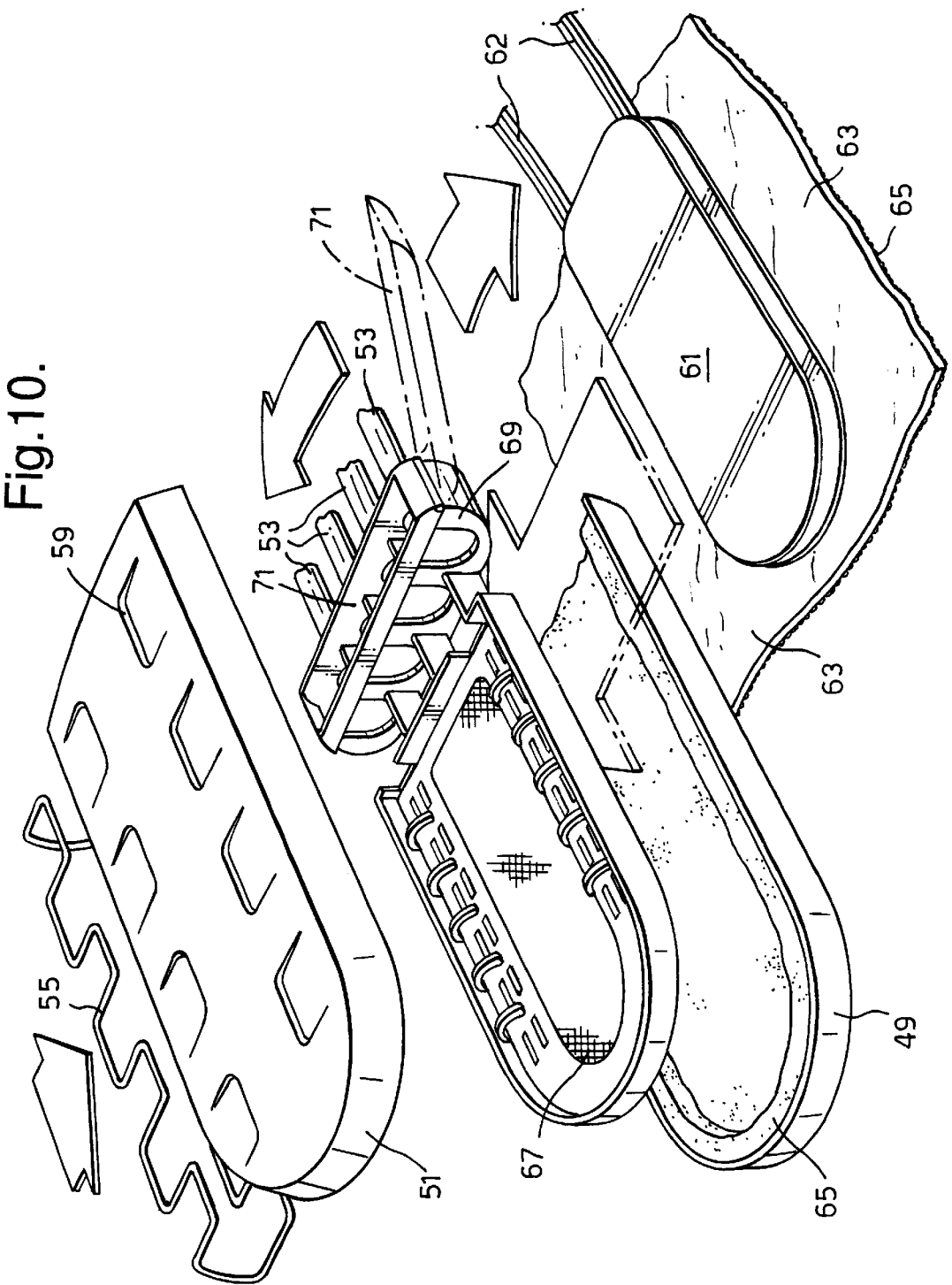
FIG. 10 is an exploded view of another optical fiber splice closure according to the invention.

FIG. 10 shows the various components of another optical fiber splice closure according to the invention. This closure is similar to those shown in the previous figures, with the main difference being in the design of the storage means. In this closure, the storage means comprises a substantially rigid member 61 around which the stored optical fibers 62 are wound, which rigid member is contained, in use, in a wraparound flexible bag 63. The interior of the wraparound bag 63 is substantially free from sealant, but its external surface is preferably coated with sealant 65. More sealant 65 (preferably gel sealant) is shown contained in half-shell 49. Also shown in this figure is a mesh 67 which forms part of the support 1. The two parts 69 and 71 of the housing of the cable-entry part are hinged to each other in this embodiment of the invention.

Figure 11:
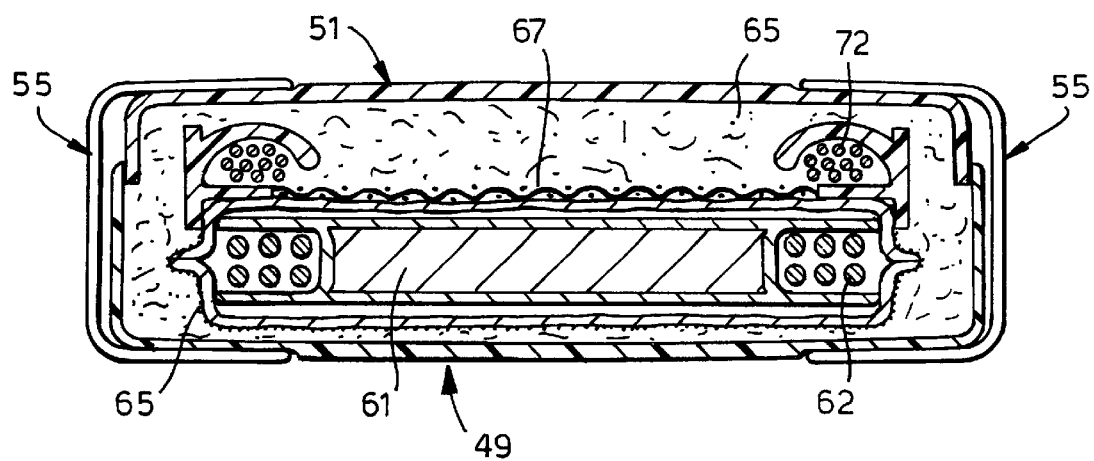
FIG. 11 is a cross-sectional view of a closure similar to that of FIG. 10 as assembled.

FIG. 11 shows a cross-sectional view of a closure similar to that of FIG. 10 when completely assembled and installed around spliced optical fibers 72 and non-spliced optical fibers 62.

The four views of FIG. 12 illustrate, schematically, the phenomenon of hydrostatic or pseudo-hydrostatic distribution of pressure in gel sealant mentioned earlier. FIG. 12A shows the application of compressive forces F on two crossing optical fibers 73 between rigid parts 75. The small arrows indicate the high degree of localized pressure exerted on the optical fibers at their point of contact, which can cause attenuation of the signals carried by the fibers. In FIG. 12B the situation is exactly the same except that in this case the optical fibers 73 are encapsulated in gel sealant between the rigid parts 75. In this case the hydrostatic or pseudohydrostatic distribution of the pressure in the gel sealant means that there is little or no localized pressure on the optical fibers at their point of contact, thus substantially avoiding signal attenuation in the fibers.

Figure 12A:
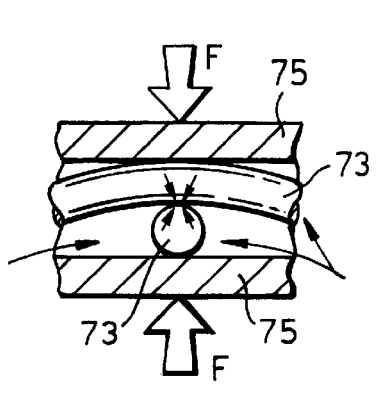
FIGS. 12A, 12B, 12C, and 12D show four views illustrating the effect of pressure on two optical fibers in contact with each other.
Figure 12B:
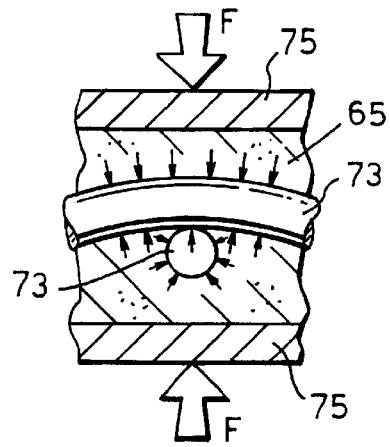
Figure 12C:
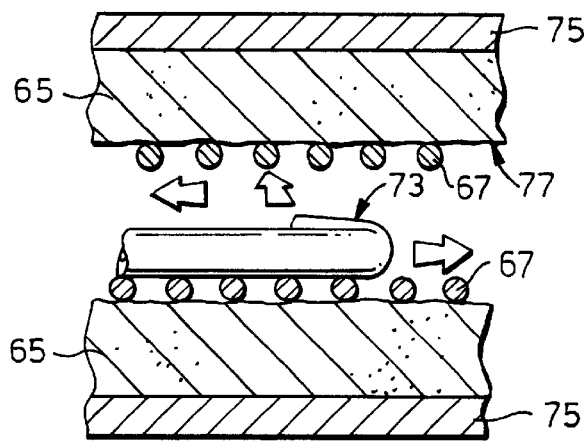
Figure 12D:
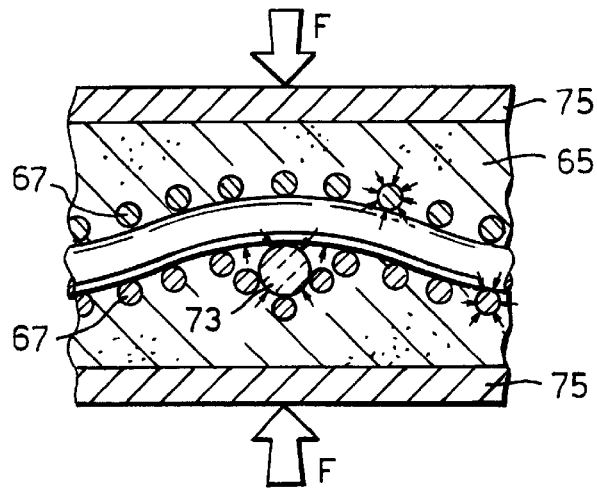

In FIGS. 12C and 12D, there is a mesh 67 located on each gel sealant surface 77. This has the advantage that prior to putting the gel sealant 65 under compression it is situated behind each mesh, thereby allowing the optical fibers 73 to be placed in their correct positions easily and without contacting the sealant 65 (e.g. by allowing them to adopt the "natural" route/configuration dictated by their own resilience). It also has the further advantage that when the gel sealant 65 is put under compression, some of the sealant extends or extrudes through the holes in the mesh 67 to encapsulate the optical fibers 73, thereby obtaining the hydrostatic or pseudohydrostatic distribution of pressure and the consequent avoidance (or at least reduction) in localized contact pressure and signal attenuation in the optical fibers. Furthermore, it is easy to gain access to the encapsulated optical fibers if required. If the compressive force on the sealant is released, the gel sealant which has extruded through the mesh will ordinarily withdraw back through the mesh, leaving the optical fibers substantially free of sealant. In contrast, if the meshes were not present the two contacting gel surfaces would ordinarily need to be pulled apart (due to the tacky nature of gel), which might cause damage to the optical fibers and/or signal loss in the fibers.

What is claimed is:

1. An optical fiber splice closure, comprising:
   a casing for containing a plurality of optical fiber splices;
   a support contained in the casing and on which a plurality of optical fiber splices are located;
   sealant contained in the casing and encapsulating at least part of the support; and
   storage means for storing one or more optical fibers which are not spliced in the closure, said storage means being enclosed in the casing and being at least partially encapsulated by the sealant.

2. A closure according to claim 1, wherein said support has a plurality of holes extending therethrough.

3. A closure according to claim 2, wherein said sealant extends through the holes in the support.

4. A closure according to claim 1, wherein said support comprises at least two meshes between which the spliced optical fibers are located.

5. A closure according to claim 1, further comprising securement means attached to the support, for securing one or more optical fiber cables or optical fibers extending into the casing with respect to the support.

6. A closure according to claim 5, further comprising optical fiber routing means situated between the securement means and the support.

7. A closure according to claim 5, further comprising a housing contained at least partially within the casing and which encloses the securement means.

8. A closure according to claim 7, wherein said housing contains sealant for sealing around one or more optical fiber cables secured by the securement means.

9. A closure according to claim 7, further comprising routing means contained in the housing.

10. A closure according to claim 1, wherein said storage means comprises at least one mesh on which the stored optical fibers are located.

11. A closure according to claim 10, wherein said storage means comprises at least two meshes between which the stored optical fibers are located.

12. A closure according to claim 11, wherein said storage means comprises a container containing the optical fiber(s) which it stores, and substantially excludes the sealant from its interior.

13. A closure according to claim 1, wherein said storage means is attachable to the support.

14. A closure according to claim 1, wherein said sealant comprises gel sealant.

15. A closure according to claim 1, further comprising at least one resilient member for putting or maintaining said sealant under compression.

16. An optical fiber splice closure, comprising:
a casing for containing a plurality of optical fiber splices;
storage means comprising a container in the casing, the container having stored therein one or more optical fibers; and
sealant contained in the casing and encapsulating at least part of the storage means;
said storage means substantially excluding the sealant from an interior thereof.

17. A closure according to claim 16, wherein said sealant encapsulates substantially the entire storage means.

18. A closure according to claim, 16, wherein said storage means has at least one aperture through which the stored optical fiber(s) extend(s) into interior; and wherein said storage means comprises a plurality of flexible tines being associated with the at least one aperture to form a generally conical or frusto-conical barrier around the optical fiber(s) to substantially prevent ingress of sealant into an interior of the storage means.

19. A closure according to claim 16, wherein said storage means further comprises a base and a lid.

20. A closure according to claim 16, wherein said storage means comprises a flexible bag.

21. A closure according to claim 16, wherein said storage means is attachable to the support.

22. A closure according to claim 16, wherein said sealant comprises gel sealant.

23. A closure according to claim 16, further comprising at least one resilient member for putting or maintaining said sealant under compression.

* * * * *